(12) United States Patent
Machinist et al.

(10) Patent No.: US 8,745,649 B2
(45) Date of Patent: *Jun. 3, 2014

(54) APPARATUS AND METHOD FOR OPERATING A MULTI-UNIT STORAGE FACILITY

(75) Inventors: Robert B. Machinist, Greenwich, CT (US); Kent S. Bain, Fairfield, CT (US)

(73) Assignee: Katonah Holdings LLC, New York, NY (US)

( * ) Notice: Subject to any disclaimer, the term of this patent is extended or adjusted under 35 U.S.C. 154(b) by 601 days.

This patent is subject to a terminal disclaimer.

(21) Appl. No.: 12/970,251

(22) Filed: Dec. 16, 2010

(65) Prior Publication Data

US 2011/0085037 A1   Apr. 14, 2011

Related U.S. Application Data

(63) Continuation of application No. 11/144,397, filed on Jun. 3, 2005, now Pat. No. 7,856,643.

(60) Provisional application No. 60/576,949, filed on Jun. 4, 2004.

(51) Int. Cl.
*H04N 7/16* (2011.01)
*G08G 1/14* (2006.01)
*H04N 7/18* (2006.01)

(52) U.S. Cl.
CPC . *H04N 7/181* (2013.01); *G08G 1/14* (2013.01)
USPC ................................................ 725/14; 725/9

(58) Field of Classification Search
USPC ........................................................ 725/9, 14
See application file for complete search history.

(56) References Cited

U.S. PATENT DOCUMENTS

| | | | |
|---|---|---|---|
| 5,710,557 A | 1/1998 | Schuette | 340/932.2 |
| 6,340,935 B1 * | 1/2002 | Hall | 340/932.2 |
| 6,450,411 B1 | 9/2002 | Rash et al. | 236/44 A |
| 6,615,175 B1 | 9/2003 | Gazdzinski | 704/275 |
| 6,630,893 B2 | 10/2003 | Schuette | 340/932.2 |
| 6,662,077 B2 | 12/2003 | Haag | 700/217 |
| 7,856,643 B2 | 12/2010 | Machinist et al. | 725/14 |
| 2003/0236830 A1 | 12/2003 | Ortiz et al. | 709/204 |
| 2004/0199785 A1 | 10/2004 | Pederson | 713/200 |
| 2005/0190076 A1 * | 9/2005 | Howard et al. | 340/932.2 |
| 2005/0262519 A1 | 11/2005 | Luebke et al. | 719/318 |

OTHER PUBLICATIONS

Flashback Systems Workbook-Flashback Workstation System Design Specification, "Flashback Workstation; Video System Design Specification," 57 pgs, 2004.

(Continued)

*Primary Examiner* — Jivka Raboviansky
(74) *Attorney, Agent, or Firm* — Sunstein Kann Murphy & Timbers LLP

(57) ABSTRACT

A system and method of operating a multi-user storage facility is provided. For each distinct user of the storage facility, the distinct user is associated with at least one storage unit of the facility. Video monitoring of the at least one storage unit is provided producing a video output. Each distinct user is provided over a digital communication network with private access to a view of the video output associated with the user. In this manner, each of a plurality of distinct users has access to a view of the video output associated with the user.

8 Claims, 3 Drawing Sheets

(56) References Cited

OTHER PUBLICATIONS

"FlashbackSystems.com—Flashback Screenshots," Retrieved from the Internet on May 31, 2005, http://www.flashbacksystems.com/?page=screenshots, 2 pgs.

Woodyard, Chris "Low-Tech Valet Parking Gets High-Tech Treatment," USA Today, Posted May 31, 2005, 2pgs.

Non-Final Office action, mailed Jul. 22, 2008 in related matter U.S. Appl. No. 11/144,397, 36 pgs.

Final Office action, mailed Feb. 20, 2009 in related matter U.S. Appl. No. 11/144,397, 41 pgs.

Non-Final Office action, mailed Aug. 26, 2009 in related matter U.S. Appl. No. 11/144,397, 42 pgs.

Final Office action, mailed Jan. 27, 2010 in related matter U.S. Appl. No. 11/144,397, 31 pgs.

* cited by examiner

APPARATUS AND METHOD FOR OPERATING A MULTI-UNIT STORAGE FACILITY

REFERENCE TO RELATED APPLICATIONS

The present application is a continuation of U.S. patent application Ser. No. 11/144,397 filed Jun. 3, 2005, which, in turn, claims priority from U.S. Provisional Patent Application No. 60/576,949 filed on Jun. 4, 2004, both of which are entitled Apparatus and Method for Operating a Multi-Unit Storage Facility, and both of which are incorporated herein by reference in their entirety.

TECHNICAL FIELD AND BACKGROUND ART

The present invention relates to storage facilities, and more particularly to monitoring of storage facilities.

It is known in the prior art to monitor storage facilities, for example, to protect against intrusion. Similarly, it is known in the prior art to equip storage facilities with heating, ventilation, and air conditioning (HVAC); storage facilities so equipped are typically provided with instruments that monitor conditions such as temperature of the facilities to control operation of HVAC systems.

SUMMARY OF THE INVENTION

In a first embodiment of the invention there is provided a method of operating a multi-user, multi-unit storage facility. In this embodiment, the method includes processes for each distinct user. Such processes include associating the distinct user with at least one distinct unit of the facility, causing video monitoring of the at least one distinct unit, such video monitoring having a video output, and providing, to the distinct user, private access over a digital communication network to the video output. In this manner, each of a plurality of distinct users has at least one distinct unit and private access to video output associated with video monitoring thereof.

In a related embodiment, the digital communications network includes the internet and the private access is provided over the internet, and the access is shareable by the distinct user. Furthermore, providing to the distinct user may include making available to the distinct user a web page from which access to video monitoring can be selected.

In a further related embodiment, for each distinct user, there is monitored at least one parameter associated with the at least one storage unit and a parameter output is provided to report on the at least one parameter. In this embodiment, there is provided, to the distinct user, private access over the digital communications network to the parameter output. Alternatively, or in addition, a log may be stored of the at least one parameter maintained over a period of time, and the distinct user may be provided with private access to the log of the at least one parameter. The at least one parameter may be selected from the group consisting of temperature and humidity of the at least one unit. The parameter may also be the state of one or more lights within the unit.

In addition to the features described, the provision of access to the parameter output or to the log (or to both) may, as in a case of video monitoring, optionally be accomplished by making available to the distinct user a web page from which such access can be selected.

Also, as an alternative or in addition to the various related embodiments described above, each storage unit may be dimensioned for storage of a motor vehicle. In other embodiments the storage unit may be dimensioned for storage of a plurality of motor vehicles. The method may optionally further include requiring a motor vehicle destined for storage in a targeted unit of the facility to pass through a reception region. The reception region is fitted with a camera system for capturing images of the vehicle from a plurality of positions. When the vehicle is in the reception region, the camera system is used to capture images of the vehicle from a plurality of positions prior to placement of the vehicle in the targeted unit. The captured images are stored to document physical appearance of the vehicle prior to its entry into the targeted unit.

In another embodiment, analogous to the first embodiment described above, there is provided a system for operating a multi-user, multi-unit storage facility. The system of this embodiment includes a video camera associated with each distinct unit of the facility and providing a video output that monitors the distinct unit. The system also includes a server, in communication with the video output of each video camera, coupled to a digital communication network. The server is configured to provide, to each distinct user, private access over the digital communications network to the video output for a distinct unit that is associated with the distinct user. With this system each distinct user can then privately access video monitoring of a distinct unit that is associated with the distinct user.

In certain embodiments, the storage unit is sized to hold one or more motor vehicles. In an associated embodiment, a plurality of video cameras is employed in a single storage unit. The video cameras may be shared amongst a plurality of motor vehicles within the storage unit, such that a single camera captures images of a plurality of motor vehicles. In this embodiment, a user at a remote location may access images from one or more cameras that are positioned within the view of the user's motor vehicle. Each distinct user will have a view associated with the user's motor vehicle. The user can privately access video monitoring of that view of the user's motor vehicle.

In a related embodiment of the system, there is optionally included at least one sensor associated with each distinct unit of the facility, the at least one sensor providing an output monitoring at least one of temperature and humidity of the distinct unit. The at least one sensor is in communication with the server, and the server is configured to provide, to each distinct user, private access over the digital communications network to a quantity related to sensor output for a distinct unit that is associated with the distinct user. In this fashion the distinct user can also privately access temperature or humidity data for a distinct unit that is associated with the distinct user. Alternatively or in addition, one or both of these parameters may be stored in a log, maintained over time, and presented to the user.

In another related embodiment of the system, in a manner analogous to the method previously described, as an alternative to the related system embodiments described above, in addition to them, each storage unit may be dimensioned for storage of a motor vehicle. Optionally the system further includes a camera system for capturing images of the vehicle from a plurality of positions. The camera system is mounted in a reception region through which a motor vehicle, destined for storage in a targeted unit of the facility, passes. The system includes an image storage arrangement that stores images captured by the camera system, to document physical appearance of the vehicle prior to its entry into the targeted unit.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

"Humidity" means a measure of absolute or relative humidity.

Figure 1:
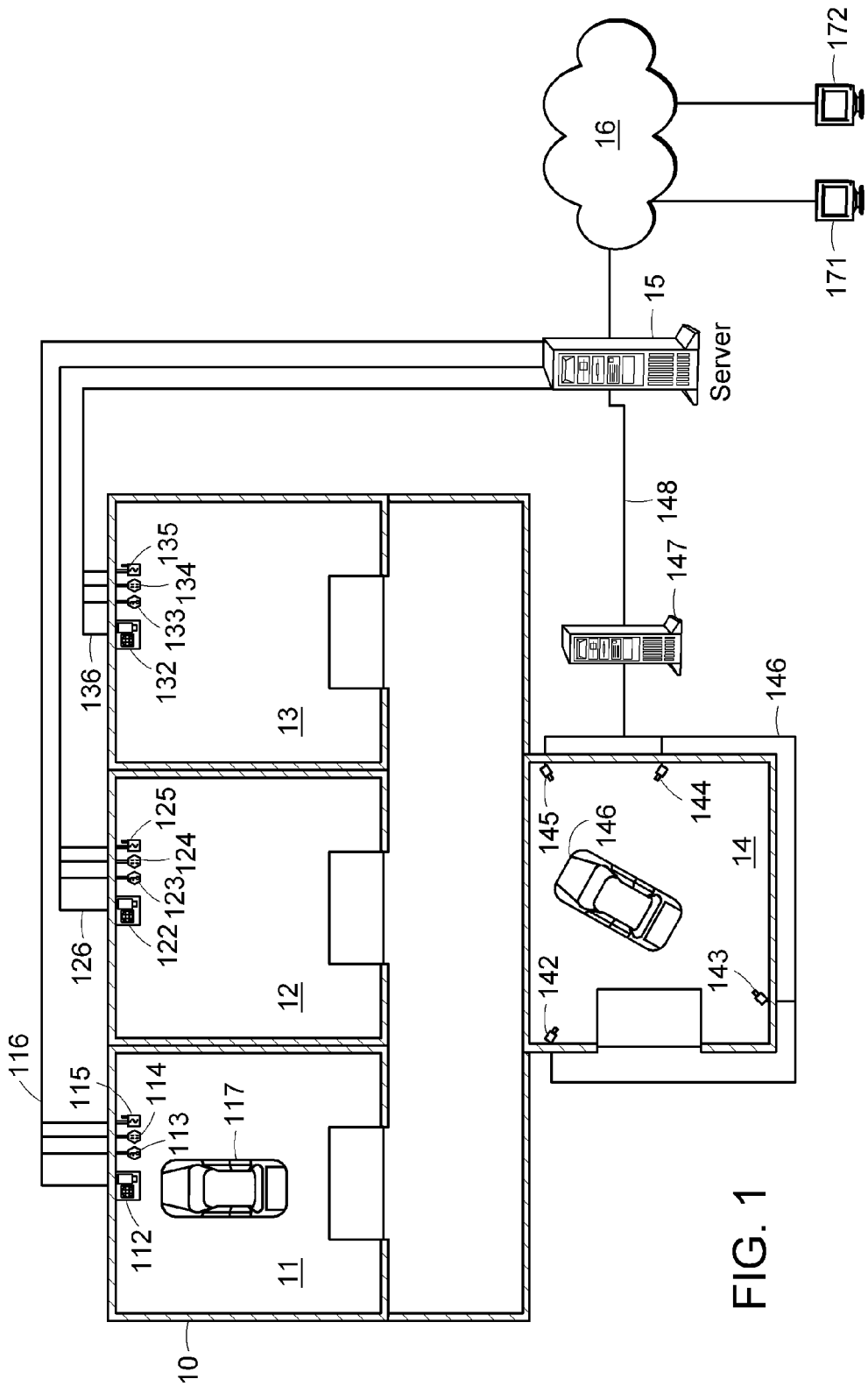
FIG. 1 provides a diagram of a multi-user, multi-unit storage facility in accordance with an embodiment of the present invention.

FIG. 1 shows a diagram of a multi-user, multi-unit storage facility 10 in accordance with an embodiment of the present invention. Although in this embodiment, for purposes of illustration, there are shown three storage units 11, 12, and 13, other embodiments of the invention may be implemented with any number of units greater than one. In this embodiment, each of the units is dimensioned to permit storage of a motor vehicle. In other embodiments, the dimensions may be altered to suit requirements of users of the facility; accordingly, some or none of the units may be dimensioned to permit storage of a motor vehicle while other units may have other sizes. Additionally, each unit may be sized to store a plurality of vehicles.

Entrance to the facility 10 is accomplished through the overhead door 141. The entrance leads to reception region 14, into which has been driven a motor vehicle 146 for storage. In this embodiment, the facility is managed so that a motor vehicle, such as motor vehicle 146, destined for storage in a targeted unit, must first pass through the reception region 14 prior to being placed in the targeted unit. The storage region 14 is equipped with a camera system of four cameras 142, 143,144, and 145. These cameras are operated to take photographs simultaneously or sequentially of all sides of the motor vehicle 146. In one embodiment, a first camera has a wide angle lens that captures a complete image of the motor vehicle. In addition there are several additional cameras that are tightly focused, so that detailed regions of the motor vehicle are captured. In the current embodiment, each of the cameras is a digital camera and has a network address and is in digital communication, over a local network shown here as item 146, with local server 147, which includes associated storage. Although the network 146 is shown as wired, any suitable communication system may be employed, including a wireless network utilizing IEEE standard 802.11(b) or (g), the so-called "WiFi" standard. The images of motor vehicle 146 are stored on local server 147 along with other information pertinent to the use and user associated with the targeted unit for motor vehicle 146 in a user profile. In certain embodiments of the invention, the images are stored on a digital video recorder separate from the server that contains the user profiles. The other information stored on local server 147 in the user profile typically includes billing information pertinent to the targeted unit, including identification and address of the user of the targeted unit, credit card or other billing information for the user, specific instructions of the user concerning care of the motor vehicle, and requirements of the user for access to the vehicle and to the targeted unit.

In other embodiments, the cameras are analog cameras that are coupled to a digital video recorder. In this embodiment, the analog image information is converted to a digital format and stored on the digital video recorder. The image information can later be recalled by the server by accessing the database that associates the digital video image information with a user profile. The information may be associated using an index that is created by the digital video recorder indexing the images to the inputs. The database on the server would have an index that would relate each camera to the input and an index of each camera and associated users.

Once a vehicle has passed through processing in the reception region 14, it may be placed in a storage unit. Representative storage units 11, 12, and 13 are shown accessible through overhead doors 111, 121, and 131 respectively. Motor vehicle 117 is here shown in storage unit 11. A combined intercom-camera system 112 is installed in the storage unit 11, while similar intercom-camera systems 122 and 132 are installed in storage units 12 and 13 respectively. Similarly units 11, 12, and 13 are respectively equipped with temperature sensors 113, 123, and 133, humidity sensors 114, 124, and 134, and smoke sensors 115, 125, and 135. In this embodiment, each storage unit has a unique IP address, and the sensors and intercom-camera system associated with the unit communicate via their unique IP address with the server 15. The unique IP address for each unit is implemented, in a manner well-known in the art, employing a local microprocessor-based client that is in communication with the intercom-camera system and sensors pertinent to the unit. The client for the unit also has a network interface that is in communication with the server 15. In other embodiments, the storage units may include one or more infrared cameras or a combined infrared/visible light camera. In such an embodiment, the storage units may include lighting that is coupled to a switch that can be activated through a remote command signal. For example, the light switch may have an associated IP address and can be controlled remotely. The infrared camera may be on at all times capturing images of the vehicle(s) that are in the storage unit. When an owner decides to view the vehicle in the storage unit, the user may remotely turn on the lights in the storage unit. The visible light camera would then be engaged. As previously stated, the cameras may be analog cameras. In such a configuration, an analog-to-digital converter is used to capture the image information in a digital format. The analog cameras may be coupled to a digital video recorder that records and stores the digital image data.

In the pictured embodiment, the units 11, 12, and 13 are shown in communication with the server over lines 116, 126, and 136 respectively. Again, as discussed previously in the context of local server 147, communication with the server 15 may alternatively be accomplished wirelessly, using for example, IEEE standard 802.11(b) or (g). Indeed, it is not required that the communication with the server even be digital over lines 116, 126, and 136. The communication may be in analog format, with separate wiring from each component associated with each unit to an analog interface at the server 15, and the analog interface can provide a digital input to server 15.

The server 15 is in communication with a wide area network, such as the internet, indicated here by cloud 16. Users of units in the storage facility employ computers 171 and 172 (for example), which may be placed in communication over the wide area network with the server 15. In this embodiment, the server 15 provides to each user private access for monitoring the contents of the storage unit (or storage units) that have been rented by the user. Each user's access is provided by the server 15 via web pages downloadable by the user, after suitable authentication, using a secure sockets layer (SSL) protocol. Thus, if a person at computer 171 is authenticated as the user who has rented access to storage unit 11, then this person may have access to monitoring of the motor vehicle 117, as well as data from the temperature, humidity, and smoke sensors 113, 114, and 115 respectively. This data may be provided in two formats: (i) current readings and (ii) a log, over time, of the readings. Additionally, the web page may be configured to transmit messages to the server for controlling one or more of the parameters. For example, the web page may include a button for changing the state of the lights in the storage unit. Upon selection by the user, a signal is sent to the server that forwards the request to the addressable lighting switch. The lighting switch responds by changing the state of the lighting within the storage unit. In other embodiments, in order to provide control of the lighting, temperature and humidity, the server may have attached assignable relays that can be programmed to turn on the lights, change the temperature within a storage unit or adjust the humidity. In another embodiment in which one or more digital video recorders are employed, the digital video recorders store the digital images from the one or more cameras. When a request to view the user's motor vehicle is made and the user is authenticated, the server uses the user's profile to determine the appropriate stored images on the digital video recorder for the user. In such an embodiment, the user would only receive the images from the server that contained his motor vehicle.

Figure 2B:
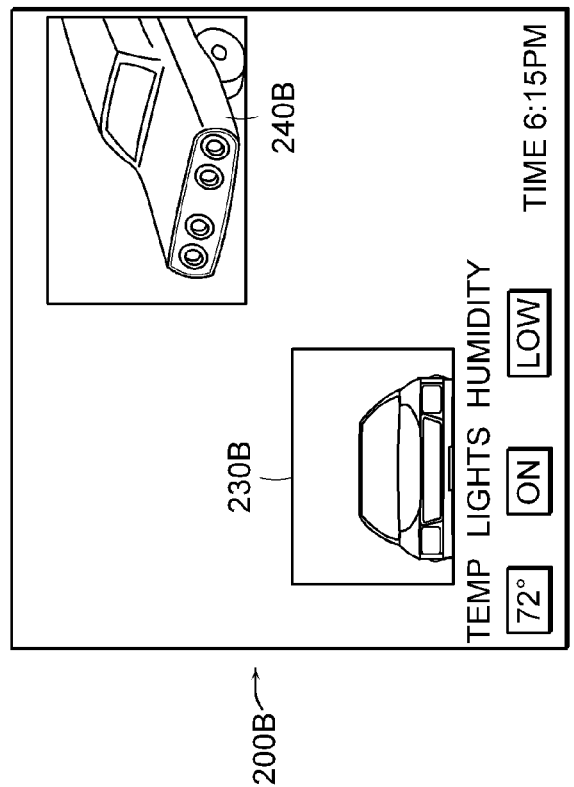
FIGS. 2A and 2B provide screen shots of two user's distinct views.
Figure 2A:
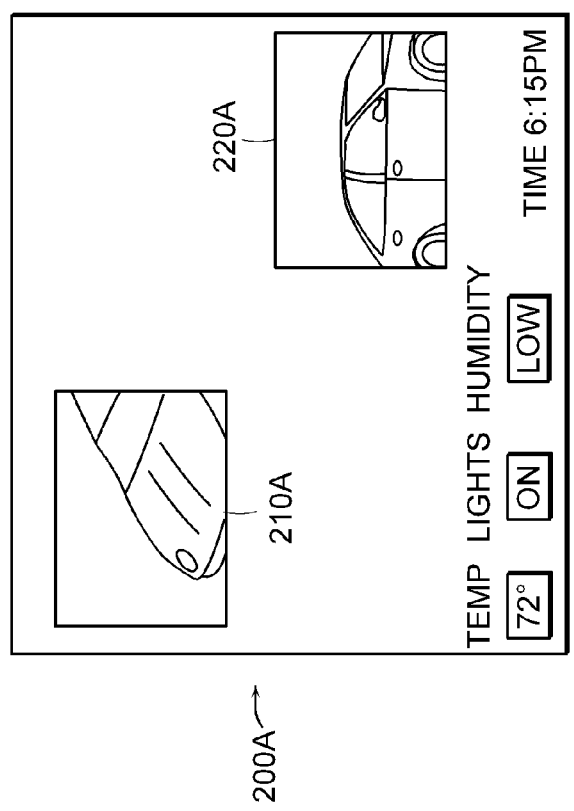

Although only a single camera is illustrated in connection with storage units 11, 12, and 13, embodiments of the invention may be implemented with a system of cameras in each unit, so as to provide user monitoring of a plurality of views of the motor vehicle. As in the case of the reception region 14, for example, there may be employed a system of four cameras. The views afforded by these cameras may be provided simultaneously or serially, over the wide area network, in accordance with selections made by the user accessing the pertinent data via the server 15. In another embodiment, a storage unit may hold a plurality of motor vehicles. Each motor vehicle within the storage unit may be owned by a separate user. In such an embodiment, a plurality of cameras is provided in the storage unit. The cameras are positioned so that each camera views one or more of the motor vehicles. In order to access the cameras and view the user's motor vehicle, the user accesses a web page that is provided by the server. The server authenticates the user, accesses a user profile containing view information, and provides the user with access to images on the web page only from cameras that view the user's motor vehicle. The user may be provided with a plurality of images of the motor vehicle from different cameras. Each unique user accessing the web page may have a different set of camera views. For example, FIGS. 2A and 2B show a web page 200A, 200B and the views of a user's car for two different users who are accessing the web page at the same time. In FIG. 2A the user is able to see a raised front view 210A and a side view 220A of the user's motor vehicle. Whereas, FIG. 2B displays front and rear images 230B, 240B of this user's motor vehicle. The cameras that provide the images for the user's car of FIG. 2A are not the same cameras as those used for providing the images of the user's car of FIG. 2B. It should be understood, that it is possible that two user's may have the same view if the same cameras capture images of both user's motor vehicles.

In a further related embodiment, the reception region 14 is used for documenting the condition of a motor vehicle when it leaves the facility. Again the camera system including cameras 142, 143, 144, and 145 is employed to photograph the motor vehicle from all four sides, and the image data is stored by local server 147 along with other information pertinent to the user. It should be understood that four cameras are shown for exemplary purposes and the invention is not tied to a set number of cameras.

To facilitate associating photographs of the motor vehicle taken in the reception region with a stored record of the user, in accordance with a further related embodiment of the invention, the user may be provided with a suitable token, such as an RFID tag, or a magnetically encoded swipe card, that uniquely identifies the user. The token may be employed by the user to gain access to the facility, and employed by the local server 147 to identify the appropriate stored user record with which to associate photographs that are taken when the user's motor vehicle has entered the reception region 14. Similarly, employment of the token may be required for the user to exit the facility, and the token may similarly be employed again by the local server 147 to associate photographs, taken on exit of the motor vehicle from the facility, with the appropriate user record.

Along with web-based access to video monitoring and sensor-data pertinent to a unit being rented by a user, there may also be provided to the user over the same web pages, via server 15, web-page access to billing information pertinent to the unit, general information concerning operation of the facility and services offered by it, and request forms for ordering motor vehicle pickup or drop-off services or services specific to mechanical or body work on the motor vehicle in the user's storage unit.

Figure 3:
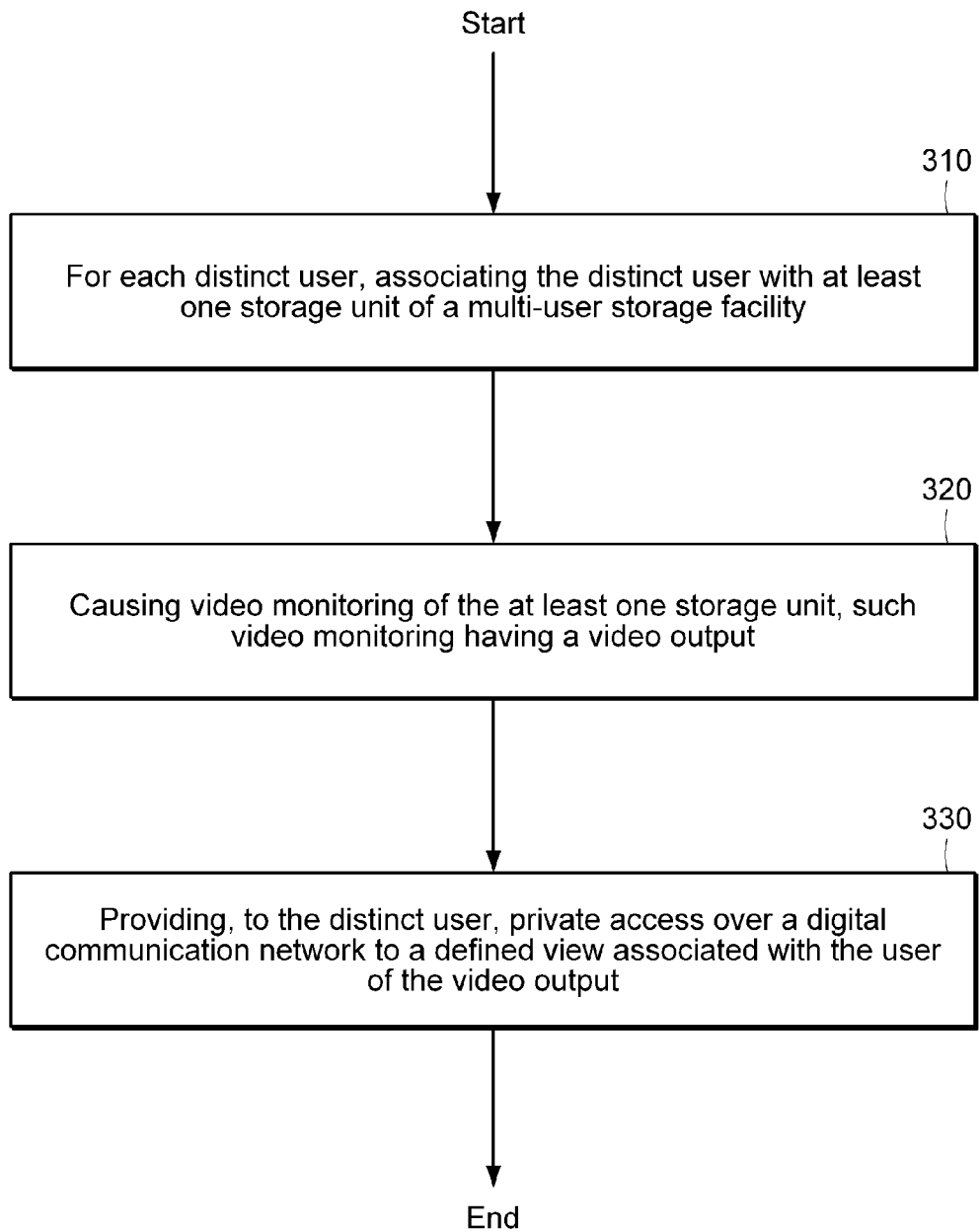
FIG. 3 provides a flow chart of a method for operating a multi-user storage facility.

FIG. 3 is a flow chart of one embodiment of the invention where a user accesses video images of the user's motor vehicle through a remote connection. First, each user of the multi-user storage facility is associated with at least one storage unit (310). Each user may be associated with a separate storage unit or storage units may be shared amongst users. As previously stated, the storage units may be associated with one or more motor vehicles where each motor vehicle within a storage unit may belong to a different user.

The motor vehicles are video monitored using at least one video camera (320). The video cameras produce a video output that is sent to the server. Each user is associated with one or more of the plurality of cameras that capture images of the user's motor vehicle wherein this association defines a "view" of the user's motor vehicle. View information may be stored at the server in a user profile database. The video output from the cameras may be continuously received by the server wherein the video cameras are always active and monitoring the vehicle, or the video output may only occur after activation of one or more of the cameras when a user logs into the web page and performs the authentication process. In such an embodiment, the server would activate only the cameras that are associated with the view of the user's motor vehicle.

The server receives the video output and based upon the user profile, the server sends the video images of the video output associated with the user's view over a communications network to the user at a remote location (330). The video output may include video images from each of the cameras or the video output may only include video images from cameras that are associated with the view of the user. If the video output includes video information from each of the cameras, the server will filter the video output and will only provide video image information to the user that is associated with the user's view.

The communications network that is employed between the server and the user's remote computer may be the Internet, a LAN (local area network) or WAN (wide area network). The server can send the video images using communication protocols such as TCP/IP to a remote computer or other device that is coupled to the communication network that is capable of displaying the video images.

The significance of these ancillary web-based services should not be minimized, because they can be used to help establish a community among users of the facility and to generate sales of services offered in addition to rental of storage units per se. Many users of a facility such as described herein are expected to be owners of classic and vintage motor vehicles, for whom a user community related to a storage facility can provide unique benefits. Although we have described monitoring access to each user that is private, it is within the scope of embodiments of the present invention for a user to make available to others images or a video stream associated with monitoring of such user's storage unit. In this fashion, a user may display such user's motor vehicle, even while being stored in the facility, to others. It is similarly within the scope of embodiments of the present invention to permit a user to control the scope of availability of such image or video stream data. For example, a user may choose to make such image or video stream data available only to others who have been given a password by the user. Alternatively, or in addition, a user may choose to make such image or video stream data available to all or certain classes of users of the facility. (For example, the user has a classic Rolls-Royce and chooses to share image data for his Rolls-Royce with users of the facility who also have Rolls-Royce motor vehicles.) Alternatively, or in addition, a user may choose to make such image or video stream data available to nonusers of the facility who meet certain criteria (for example, owners of classic Rolls-Royce motor vehicles) or to all without restriction (for example, when a motor vehicle may be offered for sale).

It is also within the scope of embodiments of the present invention, in connection with web-page access to monitoring of a storage unit, to provide advertising to a user on the same web page being used for access or on separately served web pages.

Although the embodiments described herein have related particularly to motor vehicles, they may also be employed for a wide range of other types of personal property, including, for example, antique furniture. In the antique furniture context, there may be employed a similar camera system to document condition of incoming and outgoing items in the reception region 14. Similarly the ability of users to share with others, over a wide area network such as the internet, video monitoring of the items being stored can be achieved in a manner similar to that described above in connection with motor vehicles.

What is claimed is:

1. A method of operating a multi-level network of a multi-user, multi-unit dedicated motor vehicle storage facility with a plurality of distinct unit users, such distinct unit users collectively forming a user community, the method comprising:
    (a) operating a private level network with video monitoring of the multi-user, multi-unit dedicated motor vehicle storage facility by a set of cameras, wherein a distinct subset of the set of cameras monitors a distinct set of dedicated motor vehicle storage units of the multi-user, multi-unit dedicated motor vehicle storage facility, such operating including:
    for each distinct user,
        associating the distinct user with at least one distinct motor vehicle storage unit of the set of dedicated motor vehicle storage units;
        causing video monitoring of the at least one distinct motor vehicle storage unit, such video monitoring having a video output associated with the at least one distinct motor vehicle storage unit, causing display of a motor vehicle associated with the distinct user and stored in the at least one distinct dedicated motor vehicle storage unit; and
        providing the video output to a server;
    (b) operating the server to provide connectivity over a public level network to provide via a web site, for each distinct user, private access to the video output;
    so that each of the plurality of distinct unit users of the user community has private access to the video output associated with at least one distinct motor vehicle storage unit.

2. A method according to claim 1, the method further comprising:
    requiring a motor vehicle destined for storage in a targeted distinct motor vehicle storage unit to pass through a reception region, the reception region fitted with a camera system for capturing images of the motor vehicle from a plurality of positions;
    using the camera system to capture images of the motor vehicle from a plurality of positions prior to placement of the motor vehicle in the targeted distinct motor vehicle storage unit; and
    storing the captured images to document physical appearance of the motor vehicle prior to its entry into the targeted distinct motor vehicle storage unit.

3. A system for operating a multi-user, multi-unit dedicated motor vehicle storage facility that includes a plurality of dedicated motor vehicle storage units, the system comprising:
    (a) a private level network with video monitoring of the multi-user, multi-unit dedicated motor vehicle storage facility by a set of cameras wherein a distinct subset of the set of cameras is configured to monitor a distinct set of the plurality of dedicated motor vehicle storage units, such that:
        each distinct user is associated with at least one distinct motor vehicle storage unit of the plurality of dedicated motor vehicle storage units;
        for each distinct user, the associated at least one distinct motor vehicle storage unit is monitored by video monitoring having a video output associated with the distinct motor vehicle storage unit, causing display of a motor vehicle associated with the distinct user and stored in the associated at least one distinct motor vehicle storage unit; and
        for each distinct user, the video output is provided to a server;
    (b) a server with connectivity over a public level network and configured to provide via a web site, for each distinct user, private access to the video output;
    wherein each distinct user has private access to the video output associated with at least one distinct motor vehicle storage unit.

4. A system according to claim 3, the system further comprising:
    a camera system for capturing images of a vehicle from a plurality of positions, the camera system mounted in a reception region through which a motor vehicle, destined for storage in a targeted one of the plurality of dedicated motor vehicle storage units, passes; and
    an image storage arrangement that stores images captured by the camera system, to document physical appearance of the vehicle prior to its entry into the targeted one of the plurality of dedicated motor vehicle storage units.

5. A method of operating a multi-level network of a multi-user multi-unit dedicated motor vehicle storage facility, with a plurality of distinct unit users, such distinct users collectively forming a user community, the method comprising:
    (a) operating a private level network with video monitoring of the multi-user multi-unit dedicated motor vehicle storage facility by a set of cameras, wherein a distinct subset of the set of cameras monitors a distinct set of dedicated motor vehicle storage units of the multi-user multi-unit dedicated motor vehicle storage facility, such operating including:

for each distinct user,
    associating the distinct user with at least one distinct motor vehicle storage unit of the set of dedicated motor vehicle storage units;
    causing video monitoring of the at least one distinct motor vehicle storage unit, such video monitoring having a video output, causing display of a motor vehicle associated with the distinct user and stored in the at least one distinct dedicated motor vehicle storage unit; and
    providing the video output to a server;
(b) operating the server to provide connectivity over a public level network to provide via a web site, for each distinct user, private access to a defined view of the video output;
so that each of the plurality of distinct unit users of the user community has private access to the defined view of the video output associated with at least one distinct motor vehicle storage unit.

6. A method according to claim 5, wherein each distinct motor vehicle storage unit is dimensioned for storage of at least one motor vehicle, the method further comprising:
    requiring a motor vehicle destined for storage in a distinct motor vehicle storage unit to pass through a reception region, the reception region fitted with a camera system for capturing images of the motor vehicle from a plurality of positions;
    using the camera system to capture images of the motor vehicle from a plurality of positions prior to placement of the motor vehicle in the distinct motor vehicle storage unit; and
    storing the captured images to document physical appearance of the motor vehicle prior to its entry into the distinct motor vehicle storage unit.

7. A system for operating a multi-user multi-unit dedicated motor vehicle storage facility that includes a plurality of dedicated motor vehicle storage units, the system comprising:
    (a) a private level network with video monitoring of the multi-user multi-unit dedicated motor vehicle storage facility by a set of cameras wherein a distinct subset of the set of cameras is configured to monitor a distinct set of the plurality of dedicated motor vehicle storage units, such that:
        each distinct user is associated with at least one distinct motor vehicle storage unit of the plurality of dedicated motor vehicle storage units;
        for each distinct user, the associated at least one distinct motor vehicle storage unit is monitored by video monitoring having a video output associated with the distinct motor vehicle storage unit, causing display of a motor vehicle associated with the distinct user and stored in the associated at least one distinct motor vehicle storage unit; and
        for each distinct user, the video output is provided to a server;
    (b) a server with connectivity over a public level network and configured to provide via a web site, for each distinct user, private access to a defined view of the video output;
    wherein each distinct user has user-controlled password-protected access to the defined view of the video output associated with at least one distinct motor vehicle storage unit.

8. A system according to claim 7, wherein each distinct motor vehicle storage unit of the plurality of dedicated motor vehicle storage units is dimensioned for storage of a plurality of motor vehicles, the system further comprising:
    a camera system for capturing images of a vehicle from a plurality of positions, the camera system mounted in a reception region through which a motor vehicle, destined for storage in a targeted one of the plurality of dedicated motor vehicle storage units, passes; and
    an image storage arrangement that stores images captured by the camera system, to document physical appearance of the vehicle prior to its entry into the targeted one of the plurality of dedicated motor vehicle storage units.

* * * * *